United States Patent [19]

Lindstrot et al.

[11] Patent Number: 5,074,370
[45] Date of Patent: Dec. 24, 1991

[54] DUAL-TRACK CHASSIS

[75] Inventors: Bernard Lindstrot, Krefeld; Arno Sehy, Duisburg, both of Fed. Rep. of Germany

[73] Assignee: Fried. Krupp Gesellschaft mit beschränkter Haftung, Essen, Fed. Rep. of Germany

[21] Appl. No.: 630,745

[22] Filed: Dec. 20, 1990

Related U.S. Application Data

[63] Continuation of Ser. No. 342,864, Apr. 25, 1989, abandoned.

[30] Foreign Application Priority Data

Apr. 25, 1988 [DE] Fed. Rep. of Germany ....... 3813881

[51] Int. Cl.$^5$ .......................................... B62D 55/065
[52] U.S. Cl. .................................... 180/9.52; 180/9.1; 280/6.12
[58] Field of Search ............... 180/9.52, 9.0, 9.1, 180/9.23, 9.5, 9.54, 9.56, 9.58, 9.6; 280/DIG. 1, 6.1

[56] References Cited

U.S. PATENT DOCUMENTS

| | | | |
|---|---|---|---|
| 1,474,918 | 11/1923 | Schneider | 180/9.54 |
| 3,184,867 | 5/1965 | Symmank | 180/9.54 |
| 3,638,805 | 2/1972 | Garnier | 180/9.52 |
| 4,231,699 | 11/1980 | Thompson | 180/9.1 |
| 4,324,304 | 4/1982 | Hashimoto et al. | 180/9.52 |
| 4,582,153 | 4/1986 | Shinsen | 180/9.5 |
| 4,650,017 | 5/1987 | Pelletier | 180/9.52 |
| 4,823,852 | 4/1989 | Langford | 180/9.1 |

FOREIGN PATENT DOCUMENTS 1975875 12/1967 Fed. Rep. of Germany .
2536652 2/1977 Fed. Rep. of Germany .

OTHER PUBLICATIONS

W. Durst et al., "Schaufelradbagger" [Rotary Bucket Excavator] (1986), p. 139.
Patent Abstracts of Japan, vol. 10, No. 126, p. M-477 (May 10th, 1986) JP 60-253,629.

Primary Examiner—Charles A. Marmor
Assistant Examiner—Anne Marie Boehler
Attorney, Agent, or Firm—Spencer & Frank

[57] ABSTRACT

A dual-track chassis includes an understructure (2) for carrying a load which is pivotal about a vertical axis (6) with respect to the understructure (2). The understructure (2) is supported on two crawler members (1) by joints (4), which provide two oppositely disposed points of support. The understructure (2) is also supported by a rocker member (9), the ends of which are in turn supported by the crawler members (1). In the normal position, the rocker member (9) is parallel to a line between the two points of support provided by the joints (4) and is rotatable about an axis lying in the vertical longitudinal center plane (8) of the chassis. The distance between an axis of rotation (5) and the vertical axis (6) is smaller than the distance between the rocker member (9) and the vertical axis (6). Stability is increased by supporting the understructure (2) on the rocker member (9) using holding members (11) which provide two additional points of support for the understructure (2). Each holding member (11) includes a hydraulic cylinder (14), and the two hydraulic cylinders (14) can be connected hydraulically with one another. The holding members (11) are disposed at the same distance from an axis lying in the longitudinal center plane (8).

16 Claims, 3 Drawing Sheets

DUAL-TRACK CHASSIS

This application is a continuation of application Ser. No. 07/342,864, filed Apr. 25th 1989, now abandoned.

BACKGROUND OF THE INVENTION

The present invention relates to a dual-track chassis, and more particularly to a dual-track chassis of the type wherein an understructure carries a load which is pivotal about a vertical axis with respect to the understructure, the understructure being supported at two oppositely disposed points of support on each track and on a rocker member which, in the normal position (that is, when the chassis is on a flat surface), is parallel to a line between the two points of support and is rotatable about an axis lying in the vertical longitudinal center plane of the chassis. Each end of the rocker member is supported in a respective crawler member, and the distance of the axis of rotation from the rocker member is greater than the distance between the rocker member and the vertical axis.

In a prior art dual-track chassis which includes an understructure, a pair of crawler members, and a rocker member, a surface-mining apparatus (such as a bucket wheel excavator, putting-down equipment, or the like) is disposed on the understructure so as to be pivotal about a vertical axis. The understructure is supported on both sides by the associated crawler members so as to be tiltable in a plane extending through the vertical axis and transversely to the direction of travel. The rocker member is rotatably mounted at one end of the understructure and permits oppositely directed tilting of the two crawler members. Each end of the rocker member is supported in the associated crawler member by a spherical joint and so as to be longitudinally displaceable. In this prior art dual-track chassis, although the load is supported at three points—i.e. as determined statically—its stability is insufficient in many cases, particularly if the load is displaced into an extremely off-center position.

It has therefore been proposed, in such a dual-track chassis, to keep the distance between the axis of rotation and the rocker member greater than the distance between the rocker member and the vertical axis about which the load is pivoted, as disclosed for example in German Offenlegungsschrift (unexamined, published application) 2,536,652, which relates to a dual-track chassis of the same species. However, with such an arrangement of the axes, problems arise which can only be overcome by providing for a special position and configuration of the load supporting point in the chassis carriers as described in detail in the cited publication.

SUMMARY OF THE INVENTION

It is therefore an object of the present invention to substantially increase the stability of a dual-track chassis of this type.

This is accomplished in that the support for the understructure at the rocker member is effected through the intermediary of a hydraulic cylinder at two points of support, each disposed at the same distance from the axis lying in the longitudinal center plane. The two hydraulic cylinders can be hydraulically connected with one another.

Dual-track chassis are known which are provided with a pivotal upper structure, e.g. from Japanese Laid-open Publication number 60-253,629, in which two hydraulically connected hydraulic cylinders support the upper structure on the understructure of the chassis in such a way that the superstructure is pivotal about an axis lying in the longitudinal center plane of the chassis. However, the horizontal axis is not the axis of a rocker member disposed at the understructure but a connecting axis between the upper structure and the understructure which is rigidly connected with the crawler drive mechanisms. Thus, the hydraulic cylinders serve to horizontally adjust the upper structure by pivoting it about the horizontal axis. Aside from the fact that, compared with the present invention, this is a chassis of a completely different configuration, the dual-track chassis according to the present invention does not provide for pivoting of the superstructure about a horizontal axis.

The advantages of the present invention compared to the above-mentioned dual-track chassis, in addition to considerably increasing stability, are, in particular, that while maintaining the known system which includes a transverse rocker member, the static definition of the load is maintained in spite of a four-point support. Moreover, the hydraulic compensation can be turned off, which further increases stability, and thus the device according to the invention is particularly applicable where the center of gravity of the load travels extremely far out laterally. The present invention further makes it possible that practically the only forces generated at the four points of support on which the understructure is supported are pressure forces; this has a favorable effect particularly on the loads on the hydraulic cylinders.

Favorable conditions for support further result from the fact that the four points of support for the understructure are arranged in such a manner that the vertical axis about which the load is pivotal extends approximately in the region of the center of gravity of the surface of the quadrangle formed by the four points of support. The supporting surface (supporting figure) is enlarged further by the fact that the distance between the two points of support disposed on the rocker member is greater than half the length of the rocker member measured between its supports and smaller than the inner spacing between the tracks of the two crawler members.

According to a further embodiment, this results in particularly favorable conditions for reduction to practice if this distance is at most 0.7 times the length of the rocker member.

A structurally advantageous configuration is realized in that the understructure is given the shape of a cylindrical ring or hollow cylinder (that is, it has upper and lower ring-shaped horizontal portions and outer and inner cylindrical walls extending between the horizontal portions) and is provided with four cantilever arms whose ends each provide one of the points of support. Advantageously, the two cantilever arms associated with the rocker member each project radially from the cylindrical understructure.

The height of the understructure may be reduced in a simple manner in that the two hydraulics cylinders are disposed within the rocker member, which is configured as a hollow girder.

Advantageously, double-acting cylinders are employed as the hydraulic cylinders. Prefereably the stroke of each cylinder—beginning in its normal position—is the same in both directions. However, it is also possible in special cases to employ single-acting hydraulic cylinders, which is particularly appropriate if thrust forces exclusively are generated at the two points of support formed by the cylinders.

The chassis according to the present invention is primarily intended for smaller surface-mining equipment equipped with two crawler members, with it being possible, however, in special cases, to replace the members by wheeled drives.

DESCRIPTION OF THE PREFERRED EMBODIMENTS

Figure 3:
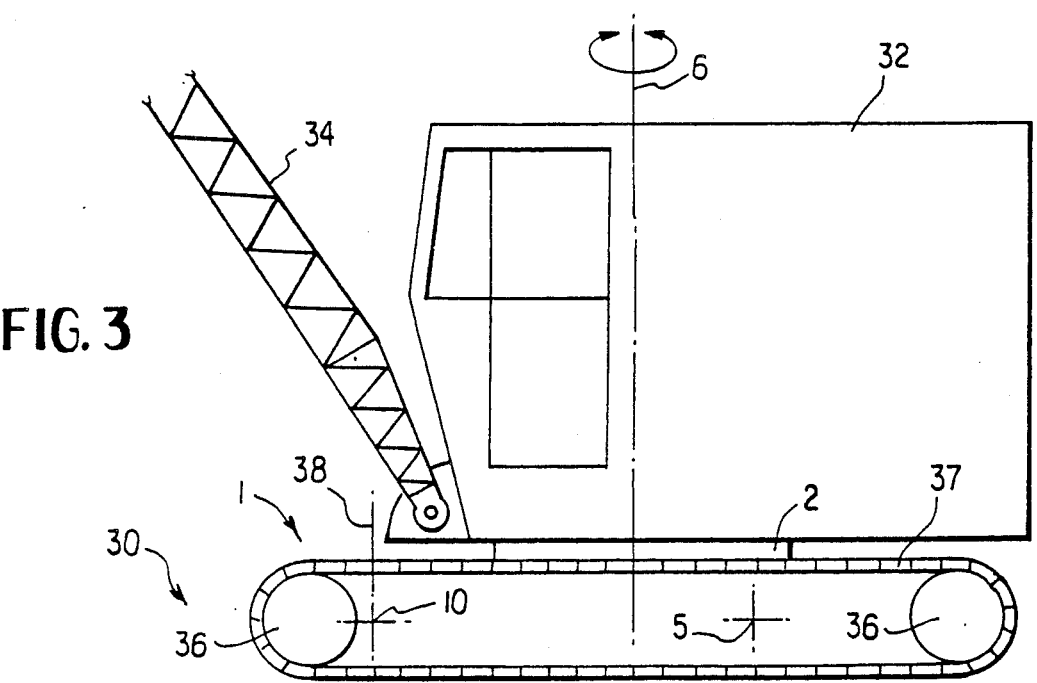
FIG. 3 is a side view of a vehicle which includes the dual-track chassis.

FIG. 3 illustrates an excavation vehicle which includes a load carried by a dual-track chassis 30 in accordance with the present invention. The vehicle shown is a crane, and the load includes cab 32, jib 34, and an ore bucket (not shown) lifted by jib 32. The chassis 30 includes two crawler members 1 (only one of which is shown in FIG. 3). Track reversal rollers 36 are rotatably mounted adjacent the front and rear ends of crawler members 1, and articulated tracks 37 (only one of which is shown in FIG. 3) are wrapped around the crawler members 1 and rollers 36.

Figure 1:
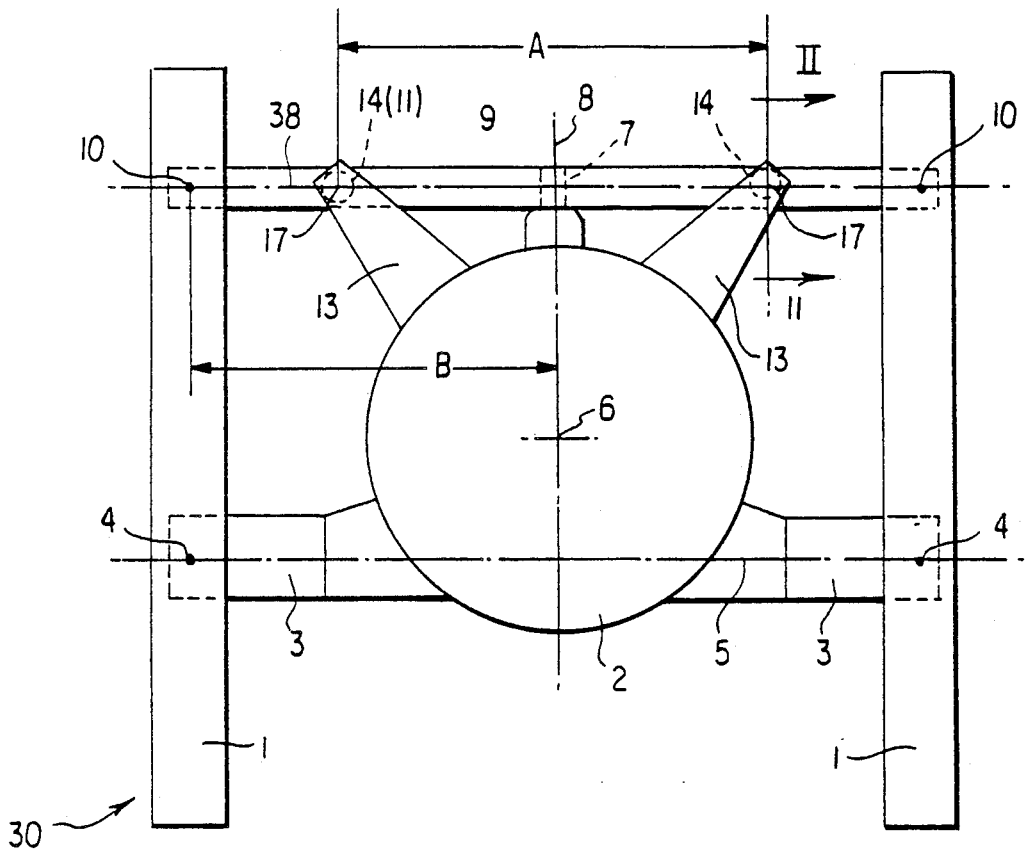
FIG. 1 is a top view of a dual-track chassis.

As can be seen in FIG. 1, chassis 30 also includes a cylindrical understructure 2 which extends between the two crawler members 1. Understructure 2 has two cantilever arms 3, which are connected to crawler members 1 via joints 4 in the manner of known pivot pin bearings. The joints 4 provide two points of support for understructure 2 and permit it to be tiltable about a horizontal axis of rotation 5. Opposite the axis of rotation 5, there is disposed at understructure 2 a pivot pin 7 whose axis lies in the vertical center plane 8 of the chassis 30. Understructure 2 has a vertical axis 6 (also see FIG. 3) which lies in vertical center plane 8. As will be seen from FIG. 1, horizontal axis 5 is eccentric with respect to vertical axis 6.

A rocker member 9 in the form of a hollow girder is mounted so as to be pivotal about pin 7 in a vertical plane 38 which is perpendicular to center plane 8.

At both its ends, rocker member 9 is supported via a ball and socket joint or spherical joint by the respective crawler member 1. Such a joint is disclosed, e.g., in the book "Schaufelradbagger" (Rotary bucket excavator) by W. Durst and W. Vogt, published in 1986 by Trans Tech Publications of D-3392 Clausthal-Zellerfeld, Fed. Rep. of Germany, on page 139. The ball and socket joints provide points of support 10 which are displacable within the respective crawler member 1 longitudinally with respect to rocker member 9 (and thus transversely with respect to the crawler members 1). Two holding mechanisms 11 are provided on rocker member 9 to supply points of support. The holding mechanisms 11 are located between pin 7 and the two points of support 10, and at the same distance from pin 7 and center plane 8, respectively. The holding mechanisms 11 lie below and at the ends of cantilever arms 13, and constitute the support between the cantilever arms and rocker member 9. The two cantilever arms 13 each extend radially from the understructure 2, which has a hollow cylindrical shape and includes upper and lower ring-shaped horizontal portions 25 and 26 along with outer and inner cylindrical walls 27 and 28 extending between the horizontal portions 25 and 26 (see FIG. 2). Understructure 2 is symmetrical to the vertical center plane 8. At their ends, the lower face of the cantilever arms 13 are shaped upwardly.

Figure 2:
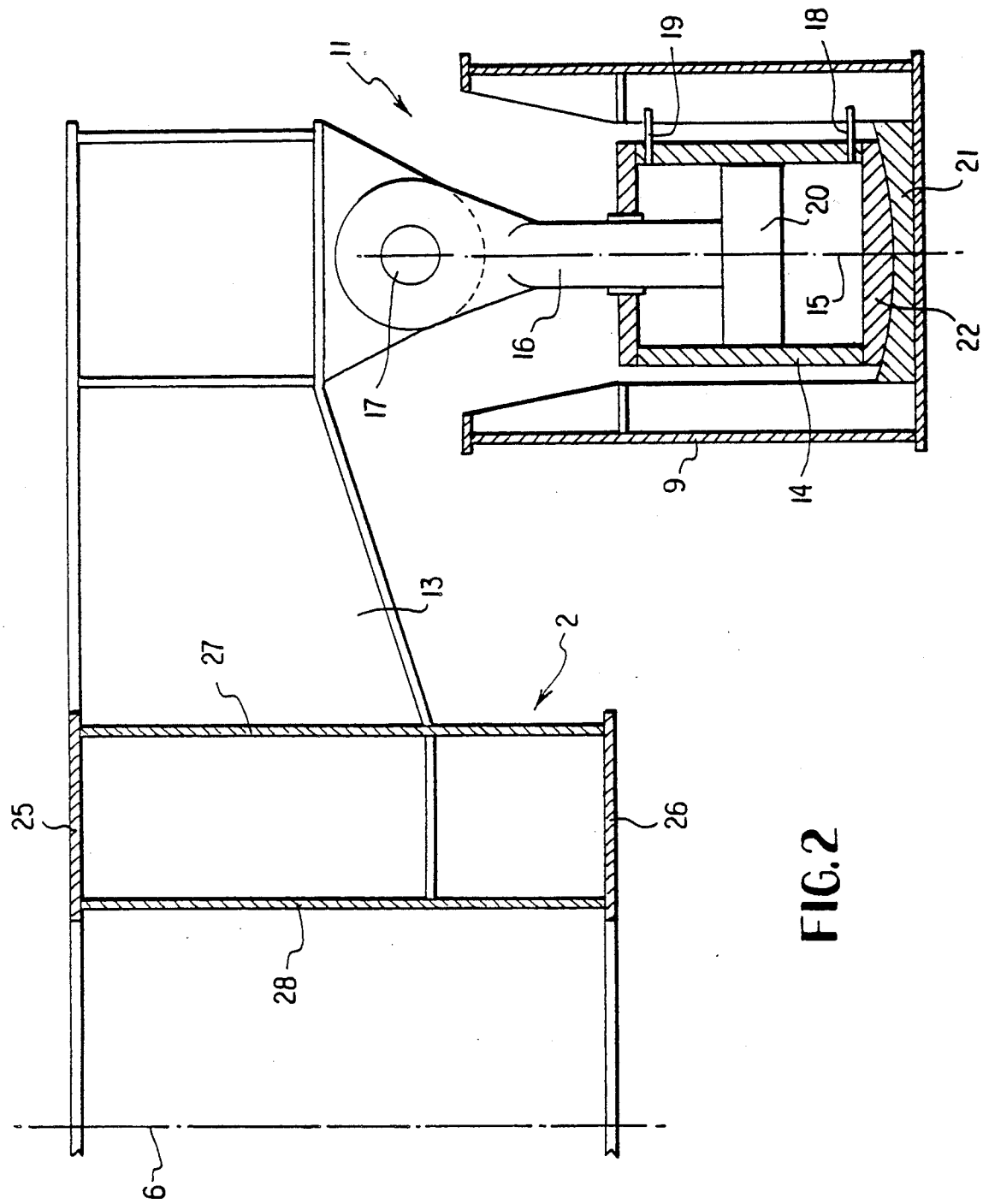
FIG. 2 is a sectional view, to a larger scale, along line II—II of FIG. 1, with the chassis in an upright position.
Figure 4:
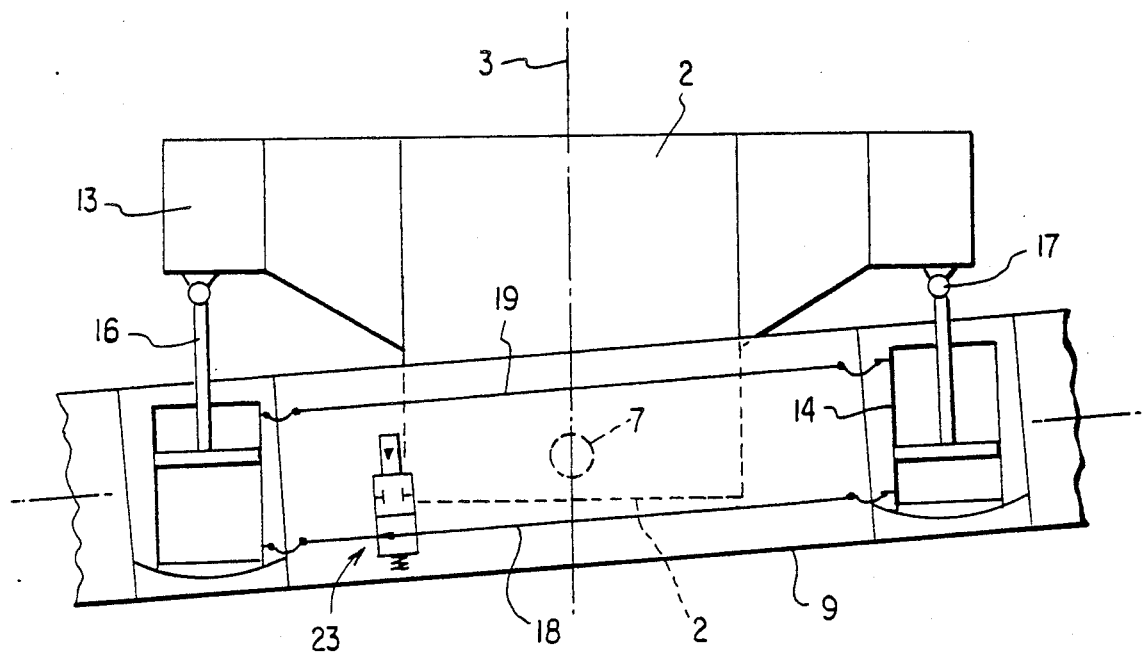
FIG. 4 is a schematic and fragmentary front view of the chassis with the rocker member being tilted.

FIG. 2 illustrates one of the holding mechanisms 11. The holding mechanisms 11 includes a double-acting hydraulic cylinder 14 which is built into the hollow rocker member 9 at the respective point of support, with its axis 15 in normal conditions coinciding with the respective point of support. Cylinder 14 is supported via concave and convex bearing members 21 and 22; the convex bearing member 22 and the front plate of the cylinder may be made as a single piece. The piston rod 16 of hydraulic cylinder 14 is connected with the respective cantilever arm 13 by way of an eye bearing 17. Eye bearing 17 and bearing members 21, 22 make tilting or rotating movement of rocker member 9 about pin 7 and relative to axis 15 possible. The distance A between the two eye bearings 17 and between the points of support provided by holding mechanisms 11, respectively, is somewhat larger than the distance B between center plane 8 and one of the points of support 10.

In the normal horizontal position of chassis 30 and rocker member 9, the pistons 20 of both hydraulic cylinders 14 are in the center position, in which the upper and lower chamber of the cylinders are of equal height.

At its upper and lower regions, cylinders 14 of the holding mechanisms 11 are provided with inlet and outlet ports for hydraulic conduits or connecting lines 18 and 19, connecting the respective upper and the lower chambers of the cylinders with one another in such a way that hydraulic compensation takes place between the respective chambers of the cylinders 14 thus making possible tilting or rotating movement of rocker member 9 about pin 7. This results in a statically determined four-point support of the understructure 2. The term "statically determined" as used herein means that at each position of rocker member 9 with respect to cantilever arms 13 or horizontal axis 5 the accuring forces in the four points of support are determinable.

If, in operation, rocker member 9 is deflected to such an extent that the maximum stroke of a piston 20 is exceeded, the piston 20 abuts at the bottom or top of the respective cylinder 14, thus transferring the load to one cylinder. The length of the stroke of each piston 20 depends of course on the size of the chassis and, in the illustrated embodiment, in which the center spacing between the two crawler members 1 is about 12 meters, comes to 2×200 mm.

Within the lower conduit or connecting line 19 there is inserted a normally open two-way valve or shut-off valve 23. In the actuated position valve 23 interrupts the connection between the lower chambers of the cylinders 14, thus making impossible any fluid flow or compensation from a chamber of one cylinder to the respective chamber of the other cylinder and thus any tilting or rotating movement of rocker member 9.

If the travel of the center of gravity of the load toward one side exceeds a certain amount, advisably the hydraulic connection between the two cylinders 14 is interrupted so that each cylinder 14 acts on its own and a statically undetermined four-point support of the understructure is formed. If then, in the most unfavorable case, one cylinder 14 takes over the entire load, this causes the rotation of rocker member 9 about pin 7 to be curtailed or stopped so that the chassis 30 tilts over the edge of the respectively stressed crawler member 1 and about the front or rear chain reversal rollers 36. The stability of the load disposed on the chassis 30 is thus increased to such an extent that even extreme loads such as, for example, the so-called full support of a bucket wheel in a bucket wheel excavator, can be handled. In this way, the distance between the center of gravity of vertical axis 6 and the tilt edge which is formed by the crawler member 1 can be increased by about 45%.

The configuration of the chassis 30 according to the invention significantly reduces the supporting forces required from the understructure 2, so that the weight of most components of the understructure 2 can become correspondingly smaller. Moreover, deformations at the understructure 2 can also be reduced. This has a favorable influence, in particular, on the service life of a ball bearing slewing gear by which the superstructure which constitutes the load is generally supported on the understructure 2. Generally no alternating stresses occur at rocker member 9, only surging loads which produce a much quieter operation of the equipment. The introduction of loads from the understructure into the carrier of each crawler member is also improved by the present invention.

It will be understood that the above description of the present invention is susceptible to various modifications, changes, and adaptations, and the same are intended to be comprehended within the meaning and range of equivalents of the appended claims.

What we claim is:

1. A dual-track chassis for carrying a load, the chassis having a vertical longitudinal center plane and comprising:
    two spaced-apart crawler members;
    an understructure between the crawler members, the understructure having a vertical axis and the load being pivotable relative to the understructure about the vertical axis;
    first means for supporting the understructure on the crawler members at two oppositely disposed points of support, the understructure being pivotable with respect to the crawler members about a horizontal axis which extends through the points of support;
    an elongated rocker member having ends;
    second means for mounting the rocker member between the crawler members so that the ends of the rocker member are supported by the crawler members, the rocker member being substantially parallel to the horizontal axis when the crawler members are on a flat surface, the distance between the rocker member and the vertical axis being greater than the distance between the vertical axis and the horizontal axis; and
    third means for supporting the understructure on the rocker member at two further points of support while permitting the rocker member to pivot about a further axis which lies in the vertical center plane of the chassis, the third means including a pair of holding mechanisms disposed at the same distance from the further axis, each holding mechanism including a respective hydraulic cylinder, the hydraulic cylinders of the holding mechanisms being connectable with one another.

2. The chassis of claim 1, wherein the four points of support define a quadrangle having a center of gravity, the four points of support being positioned so that the vertical axis passes adjacent the center of gravity of the quadrangle.

3. The chassis claim 1, wherein the second means comprises joints adjacent the ends of the rocker member, wherein the chassis further comprises tracks on the crawler members, the tracks having inner edges, and wherein the distance between the two further points of support is greater than half the distance between the joints and less than the distance between the inner edges of the tracks.

4. The chassis of claim 3, wherein the distance between the two further points of support does not exceed about 70% of the distance between the joints.

5. The chassis of claim 1, wherein the understructure is generally cylindrical-shaped, wherein the first means comprises two cantilever arms connected to the understructure, the two cantilever arms having ends and the two oppositely disposed points of support being located adjacent the ends of the cantilever arms, and wherein the third means comprises two further cantilever arms connected to the understructure, the two further cantilever arms having ends and the two further points of support being located adjacent the ends of the further cantilever arms.

6. The chassis of claim 5, wherein the further cantilever arms extend radially from the understructure.

7. The chassis of claim 1, wherein the rocker member is hollow, and wherein the hydraulic cylinders of the holding mechanisms are disposed within the rocker member.

8. The chassis of claim 1, wherein the hydraulic cylinders of the holding mechanisms are double-action hydraulic cylinders.

9. The chassis of claim 8, wherein the stroke of the hydraulic cylinders is of substantially the same magnitude in both directions when the crawler members are on a flat surface.

10. The chassis of claim 1, wherein the points of support provided by the first means are disposed at the crawler members.

11. A chassis for a tracked vehicle, comprising:
    conveying means for conveying the vehicle over a surface, the conveying means having a left portion and a right portion, the conveying means including a plurality of endless tracks;
    an understructure disposed between the left and right portions of the conveying means;
    first understructure support means for supporting the understructure on the left portion of the conveying means at a first left point of support which is located at the left portion of the conveying means and for supporting the understructure on the right portion of the conveying means at a first right point of support which is located at the right portion of the conveying means, the understructure being pivotable with respect to the conveying means about an axis which extends through the first points of support;
    an elongated rocker member disposed between the left and right portions of the conveying means at a position spaced apart from the axis, the rocker member having a left end which is supported on the left portion of the conveying means, a right end which is supported on the right portion of the conveying means, and a central region between the left and right ends; and
    second understructure support means for supporting the understructure on the rocker member, at second left and right points of support, while permitting the understructure to tilt with respect to the rocker member, the second left point of support being located between the left end of the rocker member and the central region of the rocker member and the second right point of support being located between the right end of the rocker member and the central region of the rocker member, wherein the second understructure support means includes a left hydraulic cylinder disposed at the second left point of support, a right hydraulic cylinder disposed at the second right point of support, and means for pivotably connecting the understructure to the central region of the rocker member, the left and right hydraulic cylinders being hydraulically connectable with one another.

12. The chassis of claim 11, wherein the left portion of the conveying means comprises a left crawler member for movably supporting an endless track and wherein the right portion of the conveying means comprises a right crawler member for movably supporting another endless track.

13. The chassis of claim 11, wherein the understructure support means further comprises a left concave member mounted on the rocker member at the second left point of support, a left convex member which is connected to the left hydraulic cylinder and which slidably engages the left concave member, a right concave member mounted on the rocker member at the second right point of support, and a right convex member which is connected to the right hydraulic cylinder and which slidably engages the right concave member.

14. The chassis of claim 13, wherein the rocker member is hollow, and wherein the left and right convex members and the left and right concave members are disposed inside the rocker member.

15. The chassis of claim 11, wherein the rocker member is hollow, and wherein at least a portion of the left hydraulic cylinder and at least a portion of the right hydraulic cylinder are disposed within the rocker member.

16. The chassis of claim 11, wherein a load is rotatably supported on the understructure.

* * * * *

UNITED STATES PATENT AND TRADEMARK OFFICE
CERTIFICATE OF CORRECTION

PATENT NO. : 5,074,370
DATED : December 24th, 1991
INVENTOR(S) : Bernhard Lindstrot et al It is certified that error appears in the above-identified patent and that said Letters Patent is hereby corrected as shown below:

On the title page, Item (75) Inventors:

the correct spelling of "Lindstrot's" first name is --Bernhard--.

Signed and Sealed this

Thirteenth Day of April, 1993

Attest:

STEPHEN G. KUNIN

Attesting Officer

Acting Commissioner of Patents and Trademarks